[12] United States Patent
Gondi (10) Patent No.: US 10,387,201 B2
(45) Date of Patent: Aug. 20, 2019

(54) STORAGE PERFORMANCE-BASED VIRTUAL MACHINE PLACEMENT

(75) Inventor: Anjaneya Prasad Gondi, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 967 days.

(21) Appl. No.: 13/533,505

(22) Filed: Jun. 26, 2012

(65) Prior Publication Data

US 2013/0346615 A1   Dec. 26, 2013

(51) Int. Cl.
*G06F 15/16*   (2006.01)
*G06F 9/50*   (2006.01)

(52) U.S. Cl.
CPC .......... *G06F 9/5016* (2013.01); *G06F 9/5077* (2013.01)

(58) Field of Classification Search
CPC .. G06F 11/1484; G06F 11/1448; G06F 11/23; G06F 9/45533; G06F 9/5016
USPC ........................................................ 709/226
See application file for complete search history.

(56) References Cited

U.S. PATENT DOCUMENTS

| | | | | |
|---|---|---|---|---|
| 7,917,617 B1* | 3/2011 | Ponnapur et al. | ............ | 709/224 |
| 8,230,069 B2* | 7/2012 | Korupolu | ............ | H04L 67/1097 709/226 |
| 8,429,140 B1* | 4/2013 | Lolayekar | ......... | G06F 17/30607 707/694 |
| 8,443,077 B1* | 5/2013 | Lappas | ................. | G06F 9/5077 709/224 |
| 8,538,792 B1* | 9/2013 | Kane | ............................ | 705/7.11 |
| 8,671,166 B2* | 3/2014 | Noonan, III | ........... | G06Q 10/00 709/220 |
| 8,738,972 B1* | 5/2014 | Bakman | .............. | G06F 11/0712 714/47.1 |
| 8,762,429 B1* | 6/2014 | Reeves | ............. | G06F 17/30233 707/812 |
| 8,789,041 B2* | 7/2014 | Verma | ....................... | G06F 8/63 709/226 |
| 8,924,524 B2* | 12/2014 | Dalal | .................. | H04L 41/0843 709/203 |
| 2007/0234302 A1* | 10/2007 | Suzuki | ...................... | G06F 8/61 717/126 |
| 2007/0234337 A1* | 10/2007 | Suzuki | ...................... | G06F 8/61 717/168 |
| 2008/0201535 A1* | 8/2008 | Hara | ..................... | G06F 3/0605 711/153 |
| 2009/0222560 A1* | 9/2009 | Gopisetty | ................ | G06F 8/60 709/226 |
| 2009/0307761 A1* | 12/2009 | Iyoda | .............................. | 726/4 |
| 2010/0070870 A1* | 3/2010 | Halperin et al. | .............. | 715/742 |
| 2010/0192152 A1* | 7/2010 | Miyamoto | .............. | G06F 9/485 718/102 |
| 2010/0235832 A1* | 9/2010 | Rajagopal | ............. | G06F 3/0605 718/1 |

(Continued)

*Primary Examiner* — Kevin T Bates
*Assistant Examiner* — Clarence D McCray
(74) *Attorney, Agent, or Firm* — Thomas | Horstemeyer, LLP (57) ABSTRACT

In one embodiment, a method includes receiving, by a computer system, one or more storage performance requirements for a virtual machine. The method further includes searching, by the computer system, for a host and an associated datastore that exhibits a level of storage performance satisfying the one or more storage performance requirements. If the searching is successful, the computer system places the virtual machine on the identified host and datastore.

17 Claims, 10 Drawing Sheets

(56) References Cited

U.S. PATENT DOCUMENTS

| | | |
|---|---|---|
| 2011/0060722 A1* | 3/2011 | Li et al. ............... 707/649 |
| 2011/0078679 A1* | 3/2011 | Bozek et al. ............ 718/1 |
| 2011/0145816 A1* | 6/2011 | Glikson et al. ........... 718/1 |
| 2011/0154320 A1* | 6/2011 | Verma ............... G06F 8/63 |
| | | 718/1 |
| 2011/0185063 A1* | 7/2011 | Head et al. ............ 709/226 |
| 2011/0191492 A1* | 8/2011 | Imai .................... 709/238 |
| 2011/0231696 A1* | 9/2011 | Ji et al. .................... 714/3 |
| 2011/0307889 A1* | 12/2011 | Moriki et al. ............ 718/1 |
| 2012/0093035 A1* | 4/2012 | Kidambi et al. ....... 370/255 |
| 2012/0102199 A1* | 4/2012 | Hopmann .......... G06F 9/5044 |
| | | 709/226 |
| 2012/0185856 A1* | 7/2012 | Ashihara et al. ......... 718/1 |
| 2013/0031559 A1* | 1/2013 | Alicherry ............ 718/104 |
| 2013/0055252 A1* | 2/2013 | Lagar-Cavilla et al. .... 718/1 |
| 2013/0061223 A1* | 3/2013 | Avina et al. ............ 718/1 |
| 2013/0111468 A1* | 5/2013 | Davis ............... G06F 9/5077 |
| | | 718/1 |
| 2013/0170354 A1* | 7/2013 | Takashima et al. ..... 370/235 |
| 2013/0185414 A1* | 7/2013 | Puttaswamy Naga .... 709/224 |
| 2013/0290541 A1* | 10/2013 | Hatasaki ........... G06F 9/5077 |
| | | 709/226 |
| 2013/0297964 A1* | 11/2013 | Hegdal ............ G06F 11/0712 |
| | | 714/2 |
| 2013/0303923 A1* | 11/2013 | Lerner ............. A61B 5/02208 |
| | | 600/492 |
| 2013/0346531 A1* | 12/2013 | Hummel et al. ........ 709/212 |
| 2013/0346615 A1* | 12/2013 | Gondi .................. 709/226 |
| 2014/0143496 A1* | 5/2014 | Bert ...................... 711/130 |
| 2014/0156910 A1* | 6/2014 | Uttamchandani et al. ... 711/103 |
| 2014/0181366 A1* | 6/2014 | Venkatesh et al. ...... 711/103 |
| 2014/0350968 A1* | 11/2014 | Hahn et al. .............. 705/3 |
| 2015/0010143 A1* | 1/2015 | Yang ..................... 380/28 |

* cited by examiner

| Host/Datastore | IOPs | I/O Latency |
|---|---|---|
| H1/DS1 | 10 Million | 50 Microseconds |
| H1/DS2 | 5 Million | 150 Microseconds |
| H2/DS1 | 10 Million | 10 Microseconds |
| H3/DS1 | 10 Million | 5 Microseconds |

STORAGE PERFORMANCE-BASED VIRTUAL MACHINE PLACEMENT

BACKGROUND

In large-scale virtualized system environments, system administrators typically rely on a virtual infrastructure management server (VIMS) to place virtual machines (VMs) on the various physical servers (hosts) and datastores that are present in the environment. When a VIMS "places a VM on a host," the VIMS causes the VM to execute on that host using the host's hardware resources. When a VIMS "places a VM on a datastore," the VIMS stores the files used by the VM (e.g., virtual disks) on the physical storage device(s) containing that datastore. A VIMS can place a VM on a host and a datastore upon initial deployment, or as a result of a migration event. In the latter case, the VIMS can move the VM from an old host to a new host (and thus place the VM on the new host), move the VM from an old datastore to a new datastore (and thus place the VM on the new datastore), or both.

Certain techniques exist that enable a VIMS to automatically place VMs on hosts based on computational load metrics (e.g., central processing unit (CPU) utilization) determined for the hosts. Further, certain techniques exist that enable a VIMS to automatically place VMs on datastores based on storage load metrics (e.g., space or input/output (I/O) capacity) determined for the datastores. However, these existing techniques focus on balancing loads across hosts or datastores, without taking into account any requirements that the VMs may have with respect to the hosts/datastores on which the VIMS places them. Further, the existing techniques that collect storage load metrics assume that the storage characteristics for a given datastore will be the same across all hosts, which may not be the case if, e.g., the hosts are connected to the storage device(s) containing the datastore in an asymmetric manner.

SUMMARY

In one embodiment, a method includes receiving, by a computer system, one or more storage performance requirements for a virtual machine. The method further includes searching, by the computer system, for a host and an associated datastore that exhibits a level of storage performance satisfying the one or more storage performance requirements. If the searching is successful, the computer system places the virtual machine on the identified host and datastore.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Figure 1:
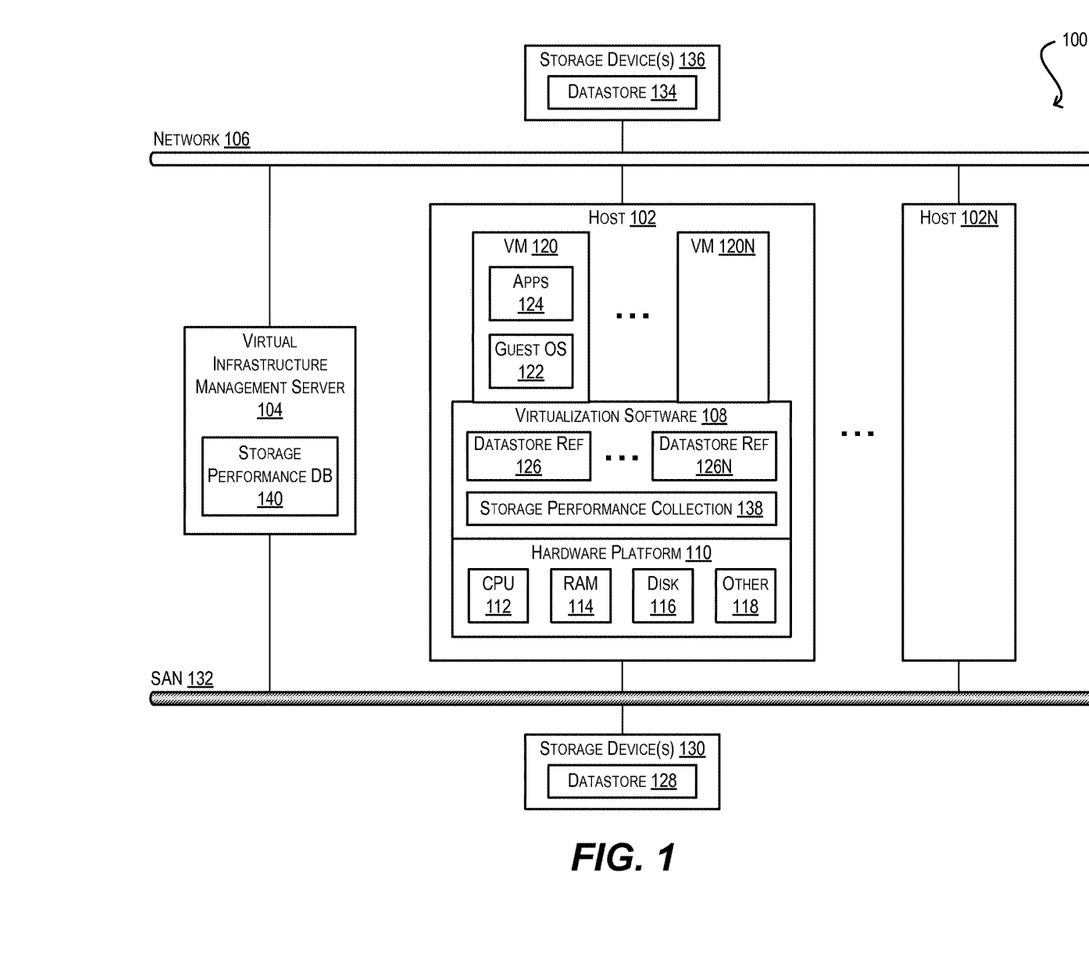
FIG. 1 illustrates a virtualized system environment according to one embodiment.

FIG. 1 illustrates a virtualized system environment 100 according to one embodiment. As shown, environment 100 includes a plurality of hosts 102-102N that are communicatively coupled with a virtual infrastructure management server (VIMS) 104 via a network 106. Network 106 can be any type of data communications network known in the art, such as a local area network (LAN), a wide area network (WAN), or the Internet. In certain embodiments, network 106 can comprise a collection of interconnected networks.

Each host 102 is a physical computer system that includes virtualization software 108 and a hardware platform 110. Virtualization software 108 can provide an environment that supports the execution of one or more virtual machines (VMs) 120-120N (each comprising a guest operating system 122 and one or more applications 124). In one embodiment, virtualization software 108 can be implemented as a "hypervisor" that executes directly on top of hardware platform 110 (without an intervening host operating system). In this embodiment, virtualization software 108 can include a kernel (not shown) that is configured to manage the use of the various hardware devices of host 102 (e.g., CPU 112, RAM 114, disk 116, other devices 118) by VMs 120-120N. In another embodiment, virtualization software 108 can be part of a "hosted" configuration in which virtualization software 108 runs on top of a host operating system (not shown). In this embodiment, virtualization software 108 can rely on the host operating system for physical resource management of hardware devices 112-118. One of ordinary skill in the art will recognize various modifications and alternatives for the design and configuration of virtualization software 108.

In addition to providing an execution environment for VMs 120-120N, virtualization software 108 can maintain references (126-126N) to one or more datastores that are associated with (i.e., mounted by) host 102. A datastore is a logical storage container for storing files that are used by VMs. For example, in one embodiment, such a datastore is a LUN that is exposed to host 102 by a networked storage system (e.g., SAN, etc.) and examples of files stored on the datastore are virtual disk files, virtual machine configuration files, and so on. In the embodiment of FIG. 1, each of the datastores referenced by datastore references 126-126N can store files that are used by VMs 120-120N (e.g., virtual disk files, etc.).

The datastores referenced by datastore references 126-126N can reside on, or be contained in, various physical storage devices (i.e., disk drives) that are accessible to host 102. For example, one of datastore references 126-126N can refer to a datastore (not shown) that is contained in local disk 116 of host 102. Another of datastore references 126-126N can refer to a datastore 128 (e.g., a LUN on one embodiment) that is contained in one or more disk drives 130 (e.g., a single disk drive, a disk array, or multiple disk arrays) remotely connected to host 102 via a storage area network (SAN) 132. Yet another of datastore references 126-126N can refer to a datastore 134 that is contained in one or more disk drives 136 remotely connected to host 130 via network 106 as network attached storage (NAS).

Generally speaking, datastores are host-independent; thus, multiple hosts can include references to (i.e., mount) the same datastore. In a scenario where two hosts H1 and H2 have mounted the same datastore DS1, the virtual machines running on hosts H1 and H2 respectively may concurrently access the storage device(s) containing DS1 (for example, if DS1 stored a virtual disk file used by H1 and a separate virtual disk file used by H2).

VIMS 104 is a physical computer system (or a cluster/farm of systems) that can run software for facilitating the configuration and management of virtualized system environment 100. For example, VIMS 104 can keep track of the datastores in environment 100, as well as the associations between hosts and datastores. In addition, VIMS 104 can orchestrate the placement of VMs on hosts 102-102N and their associated datastores.

In a particular embodiment, VIMS 104 can automate the placement of VMs on hosts 102-102N and their associated datastores in a manner that takes into account (1) storage performance requirements for each VM, and (2) storage performance metrics that VIMS 104 collects for the hosts and datastores on a per host/datastore basis. Thus, VIMS 104 can place a VM on a host/datastore combination that best meets the VM's storage performance needs. For instance, VIMS 104 can receive, from a storage performance collection component 138 resident in virtualization software 108 of each host 102, one or more storage performance metrics (e.g., I/O operations per second (IOPs), I/O latency, seek time, etc.) pertaining to each datastore mounted by the host. VIMS 104 can store these storage performance metrics in an accessible location and format, such as in storage performance database 140. The processing performed by storage performance collection component 138 of host 102 and VIMS 104 for generating and storing these storage performance metrics is described in further detail with respect to FIG. 8 below. In one embodiment, at least some of the received storage performance metrics will be different for each host/datastore combination. For example, although two hosts H1 and H2 can mount the same datastore DS1, the I/O latency for the combination of H1/DS1 may be different from the I/O latency for the combination of H2/DS1 (due to, e.g., the use of different transport links between H1/DS1 and between H2/DS1). Accordingly, VIMS 104 can store the storage performance metrics in database 140 on a per host/datastore basis (rather than simply per datastore).

At the time of deploying a particular VM, VIMS 104 can receive one or more storage performance requirements determined for the VM. In one embodiment, a user (e.g., a system administrator) can provide this information to VIMS 104 via one or more user interfaces that VIMS 104 exposes. In an alternative embodiment, another machine or process (not shown in FIG. 1) can provide this information to VIMS 104. The storage performance requirements can represent a level of storage performance deemed to be desirable for a host and datastore on which the VM is placed. VIMS 104 can then search through storage performance database 140 to find an optimal host and datastore in environment 100 that has a level of storage performance satisfying the VM's requirements. If such a host and datastore is found, VIMS 104 can deploy the VM on the host and datastore. If such a host and datastore cannot be found, VIMS 104 can deploy the VM on an alternative host and datastore that comes closest to satisfying the VM's requirements, and can continue to search for an optimal host and datastore. Once VIMS 104 has found an optimal host and datastore, VIMS 104 can move the VM to the optimal host, move the VM to the optimal datastore, or both. For example, if the optimal host is identical to the alternative host but the optimal datastore is different from the alternative datastore, VIMS 104 can move the VM from the alternative datastore to the optimal datastore (without moving the VM between hosts). As another example, if the optimal datastore is identical to the alternative datastore but the optimal host is different from the alternative host, VIMS 104 can move the VM from the alternative host to the optimal host (without moving the VM between datastores). As yet another example, if both the optimal host and datastore are different from the alternative host and datastore, VIMS 103 can move the VM from the alternative host to the optimal host and from the alternative datastore to the optimal datastore.

With the foregoing approach, VIMS 104 can ensure that a given VM is placed on a host and datastore that best matches the storage performance desired by the VM (or the applications running in the VM). Additional details regarding the processing that may be performed by VIMS 104 to carry out storage performance-based VM placement is provided in the sections that follow. Although certain scenarios are described, it will be understood that other scenarios may be appreciated.

Figure 2:
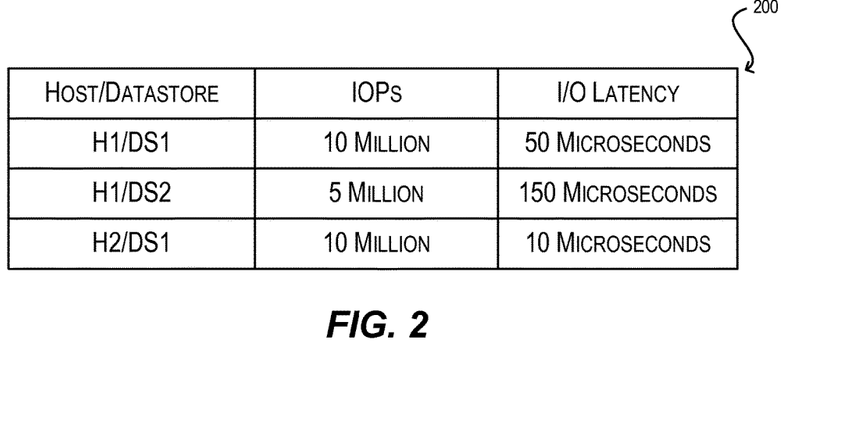
FIG. 2 illustrates example storage performance metrics according to one embodiment.

FIG. 2 illustrates a table 200 comprising exemplary storage performance metrics that VIMS 104 can store in storage performance database 140 of FIG. 1. As shown, table 200 includes three data rows or entries, where each row identifies a particular host/datastore combination and storage performance metrics for that host/datastore combination (i.e., IOPS and I/O latency (in microseconds)). Although only two types of storage performance metrics are depicted in table 200, any number of such metrics can be supported. As noted with respect to FIG. 1, VIMS 104 can receive the metrics shown in table 200 from storage performance collection component 138 of hosts 102-102N. Storage performance collection component 138 can generate and transmit these metrics to VIMS 104 at a single point in time, or at a recurring time interval (e.g., every second, every 5 minutes, every 30 minutes, every hour, etc.). In the latter case, VIMS 104 can continually update table 200 to reflect the most recently received metrics.

Figure 3:
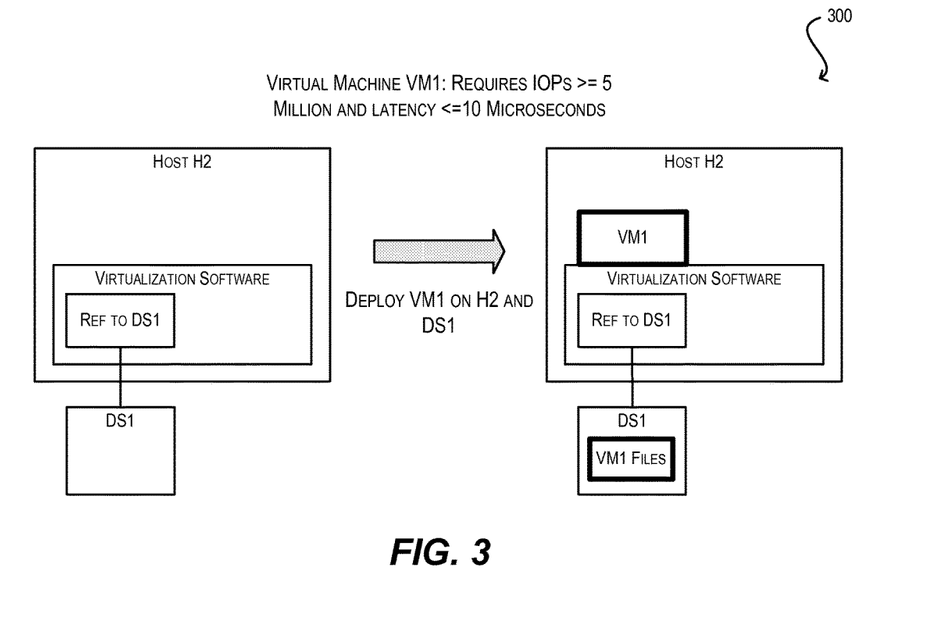
FIG. 3 illustrates a first VM deployment scenario according to one embodiment.

FIG. 3 illustrates an example VM deployment scenario 300 that may be carried out by VIMS 104 based on the storage performance metrics stored in table 200 of FIG. 2. In this scenario, VIMS 104 is able to find, at first attempt, a host/datastore combination that satisfies the VM's storage performance requirements.

As shown in FIG. 3, the virtual machine to be deployed by VIMS 104 is VM1, which requires/desires a level of storage performance corresponding to greater than or equal to 5 million IOPs, and less than or equal to 10 microseconds of I/O latency. As noted above, a user or an automated machine/process can provide these requirements to VIMS 104. In table 200, host H2 and datastore DS1 satisfies these requirements, since H2/DS1 is capable of 10 million IOPs and 10 microseconds of I/O latency. Accordingly, VIMS 104 can place VM1 on host H2 (shown by the addition of block "VM1" to host H2) and can place VM1 on datastore DS1 (shown by the addition of block "VM1 Files" to the storage device S1 backing DS1). Thus, VIMS 104 optimally places VM1 from a storage performance perspective.

Figure 4:
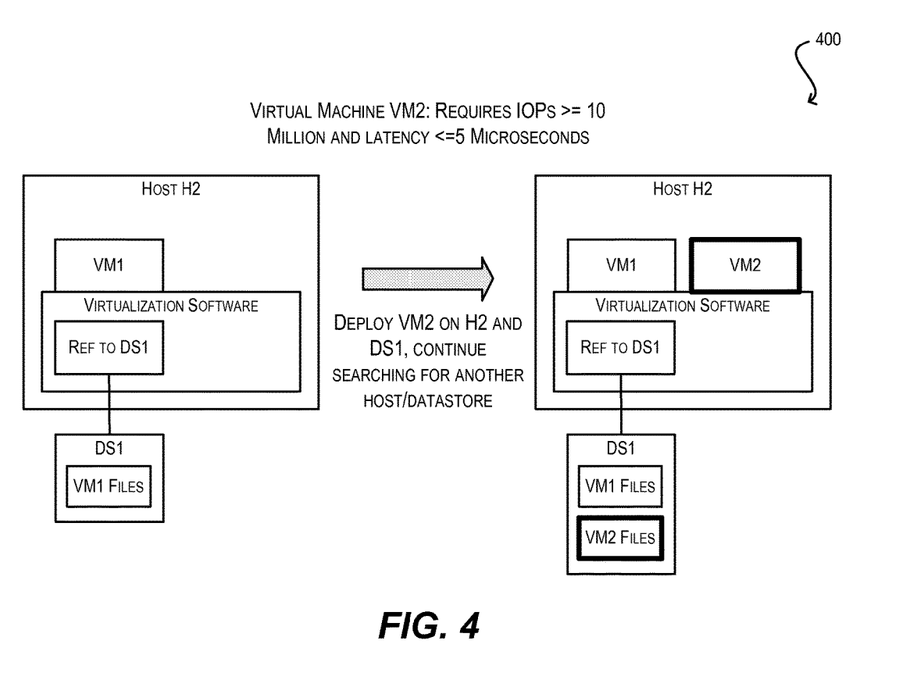
FIG. 4 illustrates a second VM deployment scenario according to one embodiment.

FIG. 4 illustrates a further VM deployment scenario 400 that may be carried out by VIMS 104 based on the storage performance metrics stored in table 200 of FIG. 2. In this scenario, VIMS 104 is unable to initially find a host/database combination that satisfies the VM's storage performance requirements.

As shown in FIG. 4, the virtual machine to be deployed by VIMS 104 is VM2, which requires/desires a level of storage performance corresponding to greater than or equal to 10 million IOPs, and less than or equal to 5 microseconds of I/O latency. In table 200, none of the host/datastore combinations satisfy these requirements. The host and datastore that come closest is host H2 and datastore DS1, which is capable of 10 million IOPs (which satisfies VM2's IOP requirement) and 10 microseconds of I/O latency (which does not satisfy VM2's latency requirement). In this situation, VIMS 104 can proceed with placing VM2 on host H2 (shown by the addition of block "VM2" to host H2) and placing VM2 on datastore DS1 (shown by the addition of block "VM2 Files" to DS1). Further, since H2/DS1 does not meet the storage performance requirements for VM2, VIMS 104 can store a flag or some other indication indicating that it should continue to search for a host and datastore that fully satisfies VM2's storage performance requirements.

Figure 5A:
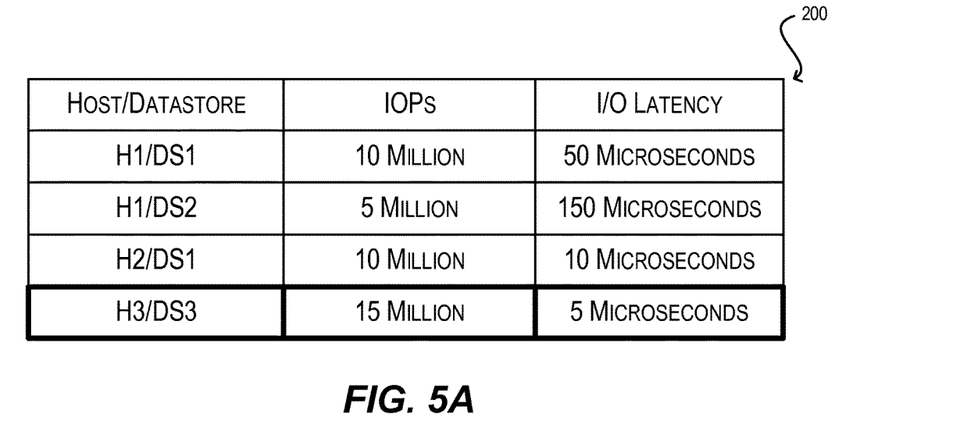
FIGS. 5A and 5B illustrate a first VM movement scenario according to one embodiment.
Figure 5B:
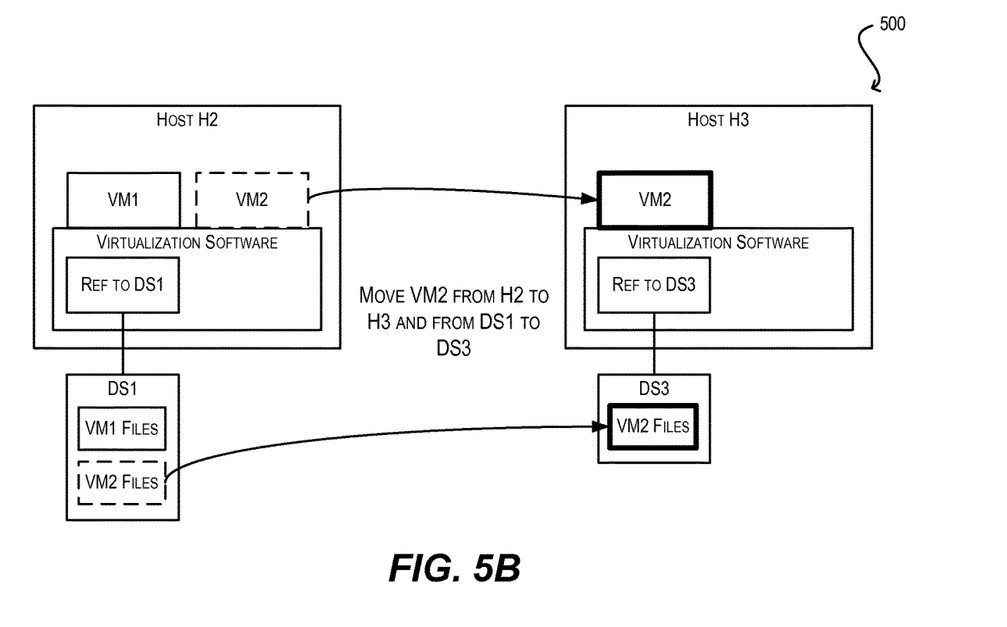

FIGS. 5A and 5B, 6A and 6B, and 7A and 7B illustrate three different scenarios that follow-on from scenario 400 of FIG. 4. For example, FIGS. 5A and 5B illustrate a scenario 500 in which VM2 is moved from host H2 and datastore DS1 to a new host and a new datastore to achieve the storage performance required by VM2.

In the embodiment of FIGS. 5A and 5B, a system administrator adds a new host H3 and datastore DS3 to virtualized system environment 100 after some period of time. Host H3 is configured to mount (i.e., include a reference to) datastore DS3, thereby causing VIMS 104 to receive, from the storage performance collection component of host H3, storage performance metrics for the combination of H3/DS3 (i.e., 15 million IOPs and 5 microseconds of I/O latency) and to add these metrics to table 200 (per FIG. 5A). Upon receiving the storage performance metrics for H3/DS3, VIMS 104 can determine that this new host/datastore combination now fully satisfies the storage performance requirements of VM2. Accordingly, in FIG. 5B, VIMS 104 can move VM2 from host H2 to host H3 (shown by the removal of block "VM2" from host H2 and the addition of this block to host H3), and move VM2 from datastore DS1 to datastore DS3 (shown by removal of block "VM2 Files" from DS1 and the addition of this block to DS3). VIMS 104 can move, or migrate, VM2 from host H2 to H3 using any VM migration technique known in the art. In a particular embodiment, VIMS 104 can perform this movement "live" (i.e., without bringing down host H2 or host H3) via a technique such as VMotion™ developed by VMware, Inc. Similarly, VIMS 104 can move, or migrate, VM2 from datastore DS1 to datastore DS3 using any VM storage migration technique known in the art. In a particular embodiment, VIMS 104 can perform this movement "live" via a technique such as Storage VMotion™ developed by VMware, Inc.

Figure 6A:
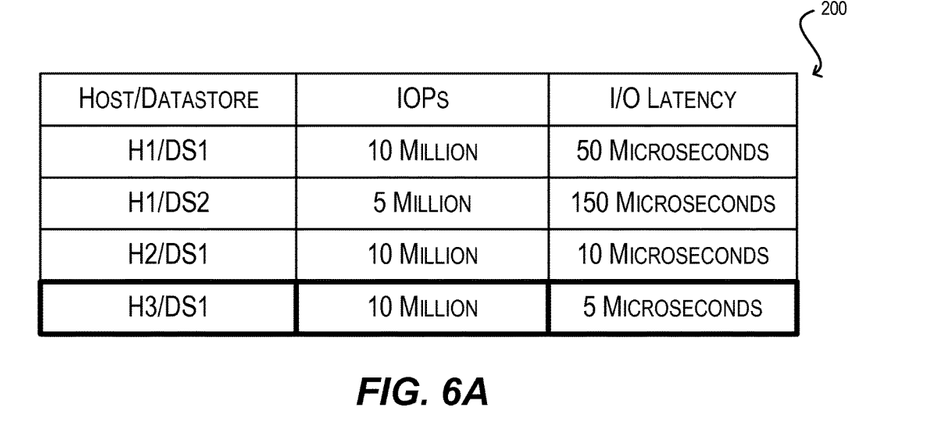
FIGS. 6A and 6B illustrate a second VM movement scenario according to one embodiment.
Figure 6B:
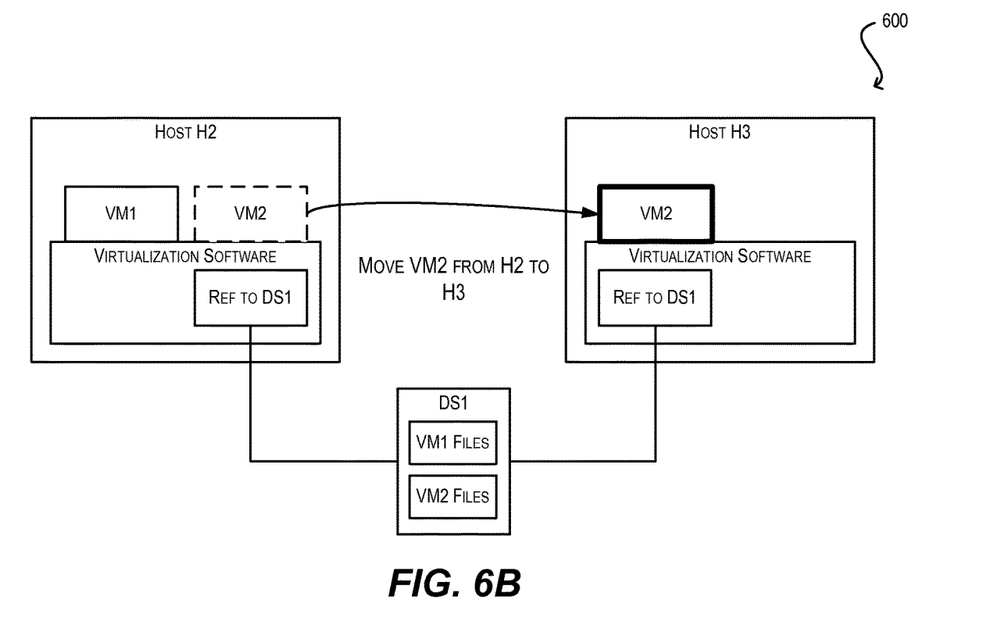

FIGS. 6A and 6B illustrate a scenario 600 in which VM2 is moved from host H2 to a new host (without moving VM2 between datastores) in order to achieve the storage performance required by VM2. In the embodiment of FIGS. 6A and 6B, a system administrator adds a new host H3 to virtualized system environment 100 after some period of time. Unlike FIGS. 5A and 5B, in this embodiment host H3 is not associated with a new datastore; rather, host H3 is configured to mount existing datastore DS1. This causes VIMS 104 to receive, from the storage performance collection component of host H3, storage performance metrics for the combination of H3/DS1 (i.e., 10 million IOPs and 5 microseconds of I/O latency) and to add these metrics to table 200 (per FIG. 6A). Note that the I/O latency of H3/DS1 is lower than the I/O latencies of H2/DS1 and H1/DS1, even though all three combinations pertain to the same datastore DS1. This may occur because, e.g., host H3 has a higher speed transport link to datastore DS1 than host H2 or host H1, or is geographically located closer to datastore DS1 than host H2 or host H1.

Upon receiving the storage performance metrics for H3/DS1, VIMS 104 can determine that H3/DS1 fully satisfies the storage performance requirements of VM2. Accordingly, in FIG. 6B, VIMS 104 can move, or migrate, VM2 from host H2 to host H3 (shown by the removal of block "VM2" from host H2 and the addition of this block to host H3). As in scenario 500, VIMS 104 can perform this movement using any of a number of VM migration techniques, such as VMotion™. In this example, there is no need for VIMS 104 to move VM2 between datastores, since the files of VM2 are already resident on optimal datastore DS1. Thus, the files of VM2 are simply maintained on DS1.

Figure 7A:
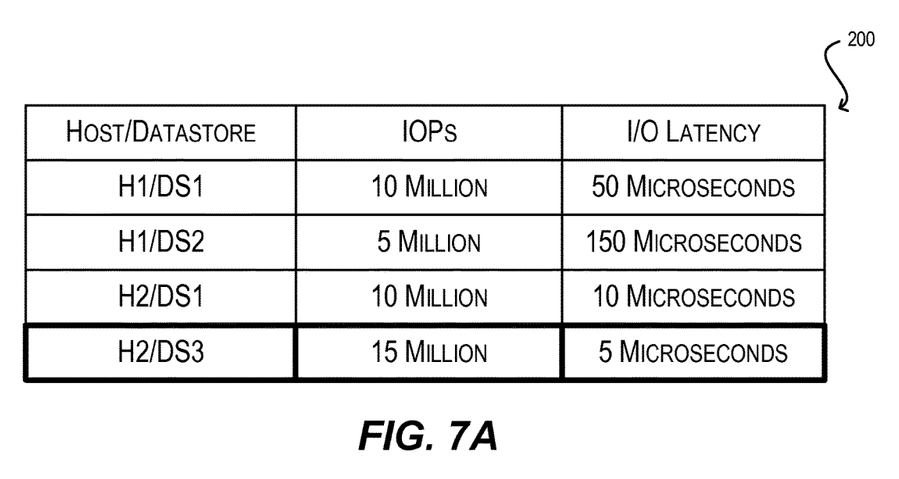
FIGS. 7A and 7B illustrate a third VM movement scenario according to one embodiment.
Figure 7B:
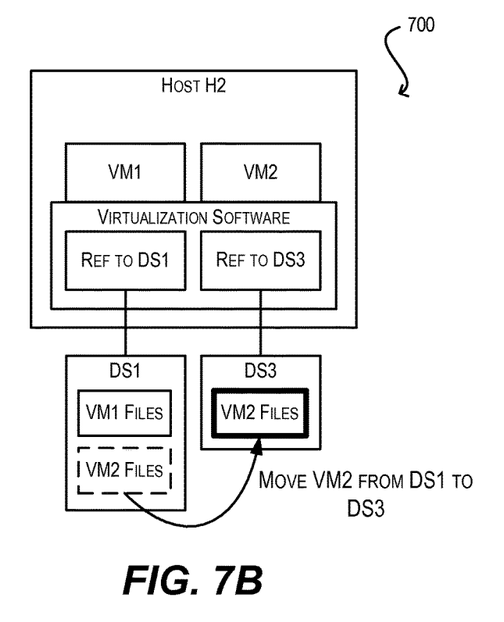

FIGS. 7A and 7B illustrate a scenario 700 in which VM2 is moved from datastore DS1 to a new datastore (without moving VM2 between hosts) in to order to achieve the storage performance required by VM2. In the embodiment of FIGS. 7A and 7B, a system administrator adds a new datastore DS3 (rather than a new host) to virtualized system environment 100 after some period of time. Further, host H2 mounts new datastore DS3. This causes VIMS 104 to receive, from the storage performance collection component of host H2, storage performance metrics for the combination of H2/DS3 (i.e., 15 million IOPs and 5 microseconds of I/O latency) and to add these metrics to table 200 (per FIG. 7A). Upon receiving the storage performance metrics for H2/DS3, VIMS 104 can determine that H2/DS3 fully satisfies the storage performance requirements of VM2. Accordingly, in FIG. 7B, VIMS 104 can move, or migrate, VM2 from datastore DS1 to datastore DS3 (shown by the removal of block "VM2 Files" from datastore DS1 and the addition of this block to datastore DS3). As in scenario 500, VIMS 104 can perform this movement using any of a number of VM storage migration techniques, such as Storage VMotion™. In this example, there is no need for VIMS 104 to move VM2 between hosts, since VM2 is already executing on optimal host H2. Thus, the execution state of VM2 is simply maintained on host H2.

Figure 8:
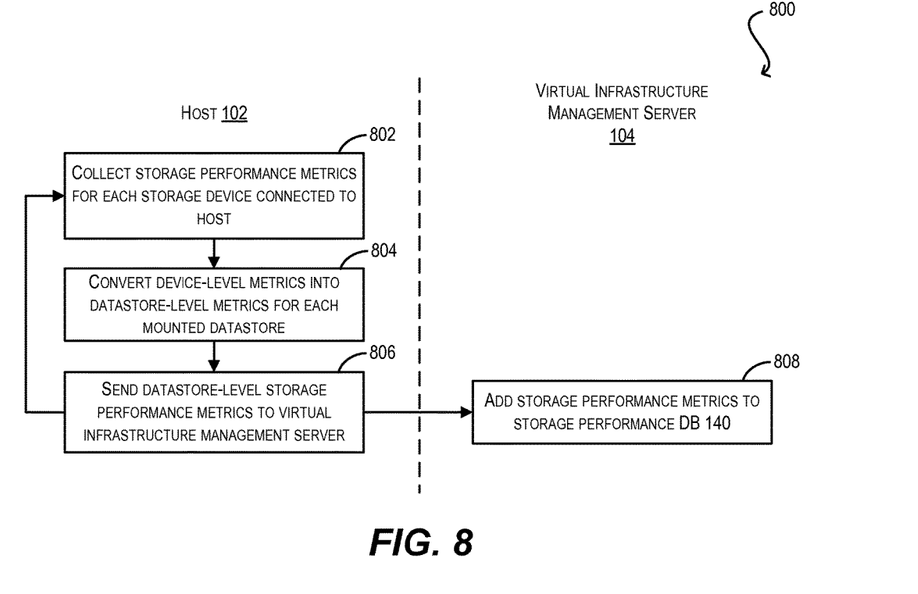
FIG. 8 illustrates a process for collecting storage performance metrics according to one embodiment.

FIG. 8 illustrates a process 800 that can be carried out by a host 102 and VIMS 104 for building storage performance database 140 of FIG. 1 according to one embodiment. In a particular embodiment, the process blocks attributed to host 102 can be performed by storage performance collection component 138 included within virtualization software 108 running on host 102.

At block 802, host 102 can collect storage performance metrics for each of the physical storage devices connected to the host (and accessible via a mounted datastore). For example, if a host H1 has mounted datastores DS1 and DS2, and if datastores DS1 and DS2 are contained on physical storage devices S1-S3 and S4-S6 respectively, host H1 can collect storage performance metrics for each of devices S1-S6. In one embodiment, the metrics host 102 collects at this stage can be similar or identical to the metrics VIMS 104 maintains at the host/datastore level in storage performance database 140 (e.g., IOPs, I/O latency, etc.).

At block 804, host 102 can convert the device-level storage performance metrics into datastore-level storage performance metrics for each mounted datastore. Returning to the example above, host H1 can convert the metrics for physical storage devices S1-S3 into metrics for datastore DS1, and can convert the metrics for physical storage devices S4-S6 into metrics for datastore DS2. In one embodiment, this conversion process can include determining the lowest performing value for each metric from among the physical storage devices for a given datastore, and using that lowest performing value as the overall metric value for the datastore. For instance, if storage device S1 has an I/O latency of 20 microseconds, storage device S2 has an I/O latency of 10 microseconds, and storage device S3 has an I/O latency of 30 microseconds, host H1 can determine the overall I/O latency of datastore DS1 as being 30 microseconds (the greatest latency of devices S1-S3). In other embodiments, host 102 can use other types of algorithms for determining datastore-level metrics, such as taking the average of storage device-level metric values.

Once the datastore-level storage performance metrics have been determined, host 102 can transmit the metrics to VIMS 104 (block 806). VIMS 104 can then store the received metrics in storage performance database 140 (block 808). As noted with respect to FIG. 1 (and as depicted in FIG. 2), VIMS 104 can store these metrics per host/datastore combination, such that each entry or row in storage performance database 134 identifies a host and datastore to which one or more storage performance metrics pertain.

In certain embodiments, after block 806, the flow of process 800 on host 102 can return to block 802. In these embodiments, host 102 can be configured to regenerate and retransmit storage performance metrics for its mounted datastores at a recurring time interval, such as every second, every 5 minutes, every 30 minutes, every hour, or the like.

Figure 9A:
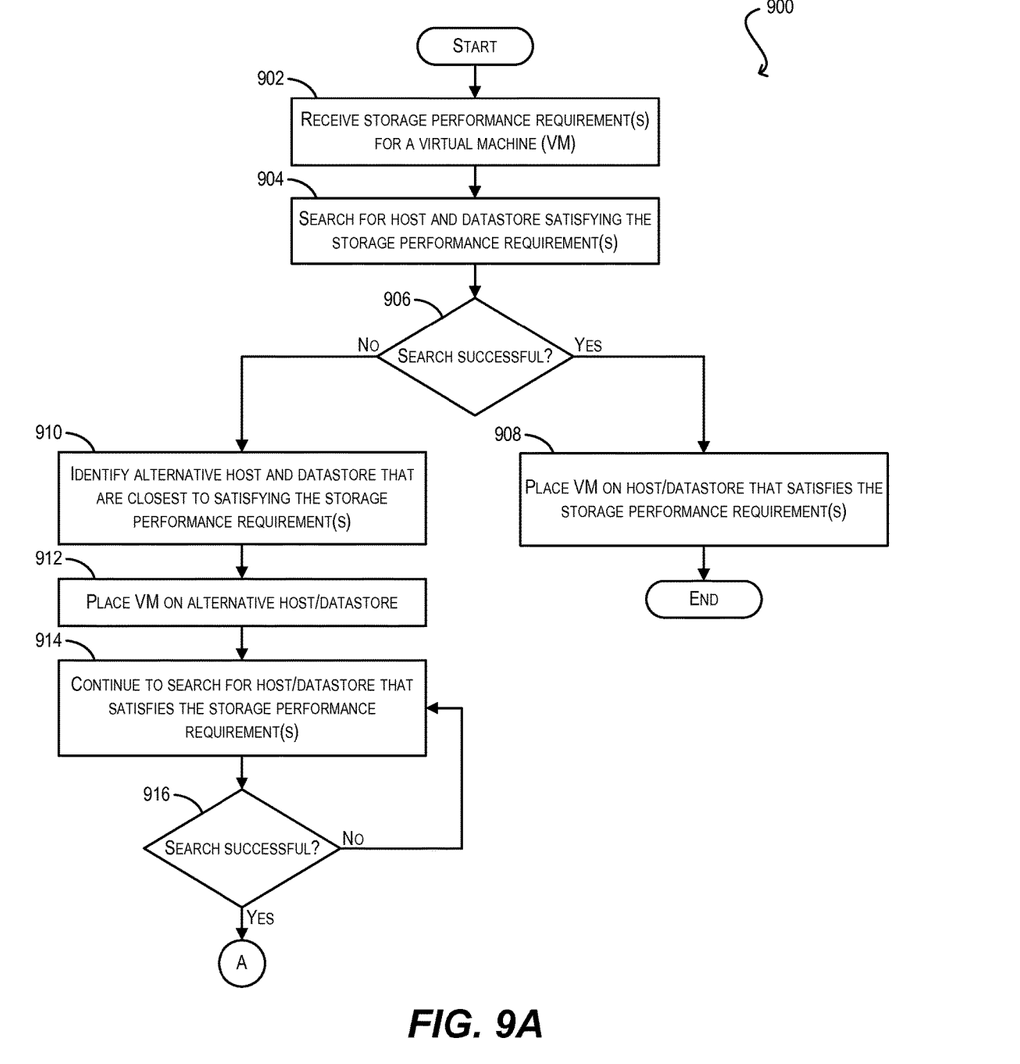
FIGS. 9A and 9B illustrate a process for performing storage performance-based VM placement according to one embodiment.
Figure 9B:
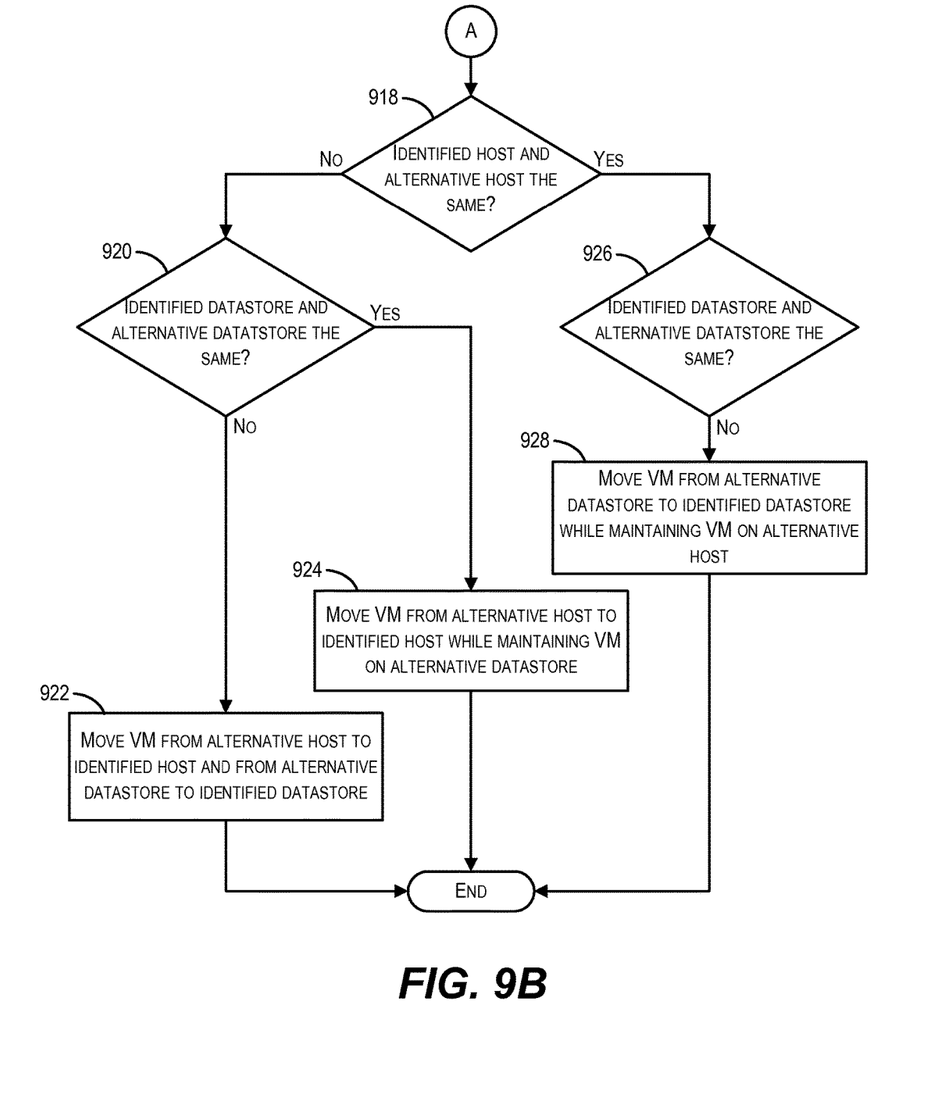

FIGS. 9A and 9B illustrate a process 900 that can be carried out by VIMS 104 for performing storage performance-based VM placement according to one embodiment. In certain embodiments, process 900 can be representative of the processing described above with respect to the examples of FIGS. 2, 3, 4, 5A, 5B, 6A, 6B, 7A, and 7B.

At block 902, VIMS 104 can receive one or more storage performance requirements for a VM that VIMS 104 will place in virtualized system environment 100. In one embodiment, a user can provide the VM's storage performance requirements to VIMS 104 via a user interface flow that VIMS 104 generates for deploying the VM. Alternatively, the VM's storage performance requirements can be received from another machine or process, or retrieved from a known storage location.

At block 904, VIMS 104 can search for a host and an associated (i.e., mounted) datastore that exhibits a level of storage performance satisfying the VM's storage performance requirements received at block 902. In one embodiment, this searching can comprise comparing the VM's storage performance requirements against the entries in storage performance database 134 to identify a host/datastore combination in database 134 that satisfies the requirements.

If the search is successful (block 906), VIMS 104 can automatically place the VM on the identified host and datastore (block 908). With respect to the host, this can include causing the VM to execute on the host. With respect to the datastore, this can include storing files used by the VM (e.g., virtual disks) on the storage device(s) backing the datastore. In some embodiments, instead of automatically placing the VM on the identified host and datastore, VIMS 104 can convey a recommendation for placing the VM on the host and datastore to a user.

If the search is unsuccessful (block 906), VIMS 104 can identify, from storage performance database 134, an alternative host and datastore that comes closest to satisfying the VM's storage performance requirements (block 910). The specific manner in which VIMS 104 determines the "closest" host and datastore can vary. For example, in one embodiment, VIMS 104 can calculate absolute differences between the VM's storage performance requirements and the storage performance metrics for each host/datastore in storage performance database 134. VIMS 104 can then select the host/datastore with the lowest absolute differences. In an alternative embodiment, VIMS 104 can rank the host/datastore combinations in storage performance DB 134 according to how close they are to the VM's storage performance requirements with respect to each individual storage performance metric. VIMS 104 can weigh the rankings per metric, and determine an aggregate ranking for each host/datastore that takes into account the metric weights. VIMS 104 can then select the host/datastore with the highest aggregate ranking. Other types of algorithms may also be used and would be apparent to one of ordinary skill in the art.

At block 912, VIMS 104 can automatically place the VM on the alternative host and datastore identified at block 910. In some embodiments, instead of automatically placing the VM on the alternative host and datastore, VIMS 104 can convey a recommendation for placing the VM on the alternative host and datastore to a user. VIMS 104 can then continue searching for a host and datastore that satisfies the VM's storage performance requirements (block 914). This can comprise waiting for new storage performance metrics to be received from the various hosts of virtualized system environment 100, and when new metrics are received, comparing the metrics against the requirements to see if the requirements are satisfied. This searching can continue indefinitely until VIMS 104 finds an optimal host and datastore, or can continue for a predefined period of time before VIMS 104 automatically concludes the search.

Turning now to FIG. 9B, if the continued searching at block 914 is successful (block 916), VIMS 104 can check whether the identified host is the same as the alternative host on which the VM was initially placed at block 912 (block 918). If not, VIMS 104 can further check whether the identified datastore is the same as the alternative datastore on which the VM was initially placed at block 912 (block 920). If the identified host is different from the alternative host and if the identified datastore is different from the alternative datastore, VIMS 104 can automatically move the VM from the alternative host to the identified host and from the alternative datastore to the identified datastore (block 922).

On the other hand, if the identified host is different from the alternative host and the identified datastore is the same as the alternative datastore, VIMS 104 can automatically move the VM from the alternative host to the identified host while maintaining the VM on the alternative datastore (block 924).

Finally, if the identified host is the same as the alternative host and the identified datastore is different from the alternative datastore (block 926), VIMS 104 can automatically move the VM from the alternative datastore to the identified datastore while maintaining the VM on the alternative host (block 928).

Although not shown in FIGS. 9A and 9B, in certain embodiments where VIMS 104 has placed a VM on a host and datastore that meets the VM's storage performance requirements (either at the time of deployment or afterwards), VIMS 104 can continue monitoring storage performance database 134 to ensure that the storage performance of the host/datastore does not subsequently fall below the VM's requirements. If the storage performance of the host/database falls below the VM's requirements (or below some other predefined threshold, such as 75% of the VM's requirements), VIMS 104 can automatically attempt to move the VM to another host and/or datastore that does meet the VM's requirements, or can report this condition to a user.

In further embodiments, in the case where VIMS 104 has placed a VM on an alternative host and datastore per block 912, VIMS 104 may not only perform a continued search for an optimal host/datastore that satisfies the VM's storage performance requirements; rather, VIMS 104 can also monitor storage performance database 134 for a host/datastore that is "closer" to the VM's requirements than the alternative host/datastore. Thus, even if no optimal host/datastore becomes available, VIMS 104 can still move the VM to a "better" host/datastore, while continuing to search for the best case scenario (i.e., a host/datastore that fully satisfies the VM's storage performance requirements).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. For example, while embodiments herein referred to a LUN exposed by a SAN as an example of a datastore, it should be recognized that, in certain embodiments, a datastore may be a logical concept defined at the virtualization software level and therefore can span multiple LUNs, comprise only portions of a LUN in certain embodiments, or comprise a combination of any other known storage systems or technologies. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method performed by a virtual infrastructure management server (VIMS) for placing virtual machines in a virtualized system environment, the method comprising:

receiving, by the VIMS, one or more storage performance requirements for a virtual machine, the one or more storage performance requirements comprising I/O operations per second (IOPs) and I/O latency;

searching, by the VIMS, for a particular combination of a first host and a first datastore from a plurality of combinations of different hosts and datastores in the virtualized system environment that exhibits a level of storage performance satisfying the one or more storage performance requirements;

in response to determining that the searching is not successful, identifying a combination of a second host and a second datastore in the virtualized system environment that is closest to satisfying the one or more storage performance requirements and that does not satisfy the one or more storage performance requirements, wherein identifying the combination comprises ranking the plurality of combinations according to how close respective ones of the plurality of combinations are to the one or more storage performance requirements, applying a respective metric weight to the ranking according to the respective storage performance requirement, determining an aggregate ranking that takes into account the metric weights; and placing the virtual machine on the second host and the second datastore having a highest aggregate ranking according to the aggregate ranking.

2. The method of claim 1 further comprising:
receiving, from each host in the combinations of different hosts and datastores, one or more storage performance metrics for each datastore that is mounted by the host.

3. The method of claim 2 further comprising:
storing the received storage performance metrics as entries in a database, each entry specifying a host/datastore combination of the combinations of different hosts and datastores and the one or more storage performance metrics for the host/datastore combination.

4. The method of claim 3 wherein searching for the first host and the first datastore comprises comparing the one or more storage performance requirements against the entries in the database.

5. The method of claim 1 wherein the virtual machine was originally placed on a third host and a third datastore in the virtualized system environment, and wherein placing the virtual machine on the second host and the second datastore comprises moving the virtual machine from the third host and the third datastore to the second host and the second datastore.

6. The method of claim 1 further comprising:
after placing the virtual machine on the second host and the second datastore, continuing to search for a first host and a first datastore in the virtualized system environment that satisfies the one or more storage performance requirements.

7. The method of claim 6 further comprising, upon finding the first host and the first datastore after placing the virtual machine on the second host and the second datastore:
in response to determining that the first host is identical to the second host and the first datastore is different from the second datastore, moving the virtual machine from the second datastore to the first datastore while maintaining the virtual machine on the second host.

8. The method of claim 6 further comprising, upon finding the first host and the first datastore after placing the virtual machine on the second host and the second datastore:
in response to determining that the first host is different from the second host and the first datastore is identical to the second datastore, moving the virtual machine from the second host to the first host while maintaining the virtual machine on the second datastore.

9. The method of claim 6 further comprising, upon finding the first host and the first datastore after placing the virtual machine on the second host and the second datastore:
in response to determining that the first host is different from the second host and the first datastore is different from the second datastore:
moving the virtual machine from the second host to the first host; and
moving the virtual machine from the second datastore to the first datastore.

10. A non-transitory computer readable storage medium having stored thereon program code executable by a VIMS for placing virtual machines in a virtualized system environment, the program code comprising:
code that causes the VIMS to receive one or more storage performance requirements for a virtual machine, the one or more storage performance requirements comprising I/O operations per second (IOPs) and I/O latency;
code that causes the VIMS to search for a particular combination of a first host and a first datastore from a plurality of combinations of different hosts and datastores in the virtualized system environment that exhibits a level of storage performance satisfying the one or more storage performance requirements;
code that in response to determining that the searching is not successful, identifies a combination of a second host and a second datastore in the virtualized system environment that is closest to satisfying the one or more storage performance requirements and that does not satisfy the one or more storage performance requirements, wherein identifying the combination comprises ranking the plurality of combinations according to how close respective ones of the plurality of combinations are to the one or more storage performance requirements, applying a respective metric weight to the ranking according to the respective storage performance requirement, determining an aggregate ranking that takes into account the metric weights; and
code that in response to determining that the searching is not successful, places the virtual machine on the second host and the second datastore having a highest aggregate ranking according to the aggregate ranking.

11. The non-transitory computer readable storage medium of claim 10 wherein the program code further comprises:
code that causes the VIMS to receive, from each host in the combinations of different hosts and datastores, storage performance metrics for each datastore that is mounted by the host, the storage performance metrics including IOPs and I/O latency.

12. The non-transitory computer readable storage medium of claim 10 wherein the code that causes the VIMS to place the virtual machine on the second host and the second datastore comprises code that causes the VIMS to deploy the virtual machine on the second host and the second datastore.

13. The non-transitory computer readable storage medium of claim 10 wherein the virtual machine was originally placed on a third host and a third datastore in the virtualized system environment, and wherein the code that causes the computer system to place the virtual machine on the first host and the first datastore comprises:
code that in response to determining the first host is identical to the third host and the first datastore is different from the third datastore, causes the computer system to move the virtual machine from the third datastore to the first datastore while maintaining the virtual machine on the third host;

code that in response to determining that the first host is different from the third host and the first datastore is identical to the third datastore, causes the computer system to move the virtual machine from the third host to the first host while maintaining the virtual machine on the third datastore; and code that in response to determining that the first host is different from the third host and the first datastore is different from the third datastore, causes the computer system to move the virtual machine from the third host to the first host; and code that in response to determining that the first host is different from the third host and the first datastore is different from the third datastore, causes the computer system to move the virtual machine from the third datastore to the first datastore.

14. A computer system operable for placing virtual machines in a virtualized system environment, the computer system comprising:
a processor configured to:
receive one or more storage performance requirements for a virtual machine, the one or more storage performance requirements comprising I/O operations per second (IOPs) and I/O latency;
search for a particular combination of a first host and a first datastore from a plurality of combinations of different hosts and datastores in the virtualized system environment that exhibits a level of storage performance satisfying the one or more storage performance requirements;
in response to determining that the searching is successful, place the virtual machine on the first host and the first datastore; and
in response to determining that the searching is not successful,
identify a combination of a second host and a second datastore in the virtualized system environment that is closest to satisfying the one or more storage performance requirements and that does not satisfy the one or more storage performance requirements, wherein identifying the combination comprises ranking the plurality of combinations according to how close respective ones of the plurality of combinations are to the one or more storage performance requirements, applying a respective metric weight to the ranking according to the respective storage performance requirement, determining an aggregate ranking that takes into account the metric weights; and
place the virtual machine on the second host and the second datastore.

15. The computer system of claim 14 wherein the processor is further configured to receive, from each host in the combinations of different hosts and datastores, storage performance metrics for each datastore that is mounted by the host, the storage performance metrics including IOPs and I/O latency.

16. The computer system of claim 14 wherein placing the virtual machine on the second host and the second datastore comprises deploying the virtual machine on the second host and the second datastore.

17. The computer system of claim 14 wherein the virtual machine was originally placed on a third host and a third datastore in the virtualized system environment, and wherein placing the virtual machine on the first host and the first datastore comprises:
in response to determining that the first host is identical to the third host and the first datastore is different from the third datastore, moving the virtual machine from the third datastore to the first datastore while maintaining the virtual machine on the third host;
in response to determining that the first host is different from the third host and the first datastore is identical to the third datastore, moving the virtual machine from the third host to the first host while maintaining the virtual machine on the third datastore; and
in response to determining that the first host is different from the third host and the first datastore is different from the third datastore:
moving the virtual machine from the third host to the first host; and
moving the virtual machine from the third datastore to the first datastore.

* * * * *